United States Patent
Jin et al.

(10) Patent No.: US 8,954,946 B2
(45) Date of Patent: Feb. 10, 2015

(54) STATIC BRANCH PREDICTION METHOD AND CODE EXECUTION METHOD FOR PIPELINE PROCESSOR, AND CODE COMPILING METHOD FOR STATIC BRANCH PREDICTION

(75) Inventors: Tai-song Jin, Seoul (KR); Dong-kwan Suh, Uiwang-si (KR); Suk-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1419 days.

(21) Appl. No.: 12/692,735

(22) Filed: Jan. 25, 2010

(65) Prior Publication Data

US 2010/0205405 A1 Aug. 12, 2010

(30) Foreign Application Priority Data

Feb. 12, 2009 (KR) .................. 10-2009-0011513

(51) Int. Cl.
*G06F 9/45* (2006.01)
*G06F 9/30* (2006.01)
*G06F 9/38* (2006.01)

(52) U.S. Cl.
CPC .......... *G06F 9/30058* (2013.01); *G06F 9/3846* (2013.01)
USPC .............................. 717/161; 717/140; 717/151

(58) Field of Classification Search
None
See application file for complete search history.

(56) References Cited

U.S. PATENT DOCUMENTS

| 6,021,272 | A  | * | 2/2000  | Cahill et al. ................ 717/147 |
|-----------|----|---|---------|---------------------------------------|
| 6,421,774 | B1 | * | 7/2002  | Henry et al. ................ 712/239 |
| 6,446,197 | B1 |   | 9/2002  | Krishnan et al.                       |
| 6,678,886 | B2 | * | 1/2004  | Kumon ........................ 717/140 |
| 6,772,325 | B1 |   | 8/2004  | Irie et al.                           |
| 6,813,763 | B1 | * | 11/2004 | Takahashi et al. ............ 717/151 |

(Continued)

FOREIGN PATENT DOCUMENTS

KR 10-2001-0037992 5/2001
KR 10-2008-0023723 3/2008

OTHER PUBLICATIONS

Joao et al. Improving the Performance of Object-Oriented Languages with Dynamic Predication of Indirect Jumps. Proceedings of the 13th international conference on Architectural support for programming languages and operating systems, 2008, pp. 80-90, Retrieved on [2014-08024] Retrieved from the Internet: URL<http://dl.acm.org/citation.cfm?id=134>.*

(Continued)

*Primary Examiner* — Thuy Dao
*Assistant Examiner* — Cheneca Smith
(74) *Attorney, Agent, or Firm* — NSIP Law

(57) ABSTRACT

A static branch prediction method and code execution method for a pipeline processor, and a code compiling method for static branch prediction, are provided herein. The static branch prediction method includes predicting a conditional branch code as taken or not-taken, adding the prediction information, converting the conditional branch code into a jump target address setting (JTS) code including target address information, branch time information, and a test code, and scheduling codes in a block. The code may be scheduled into a last slot of the block, and the JTS code may be scheduled into an empty slot after all the other codes in the block are scheduled. When the conditional branch code is predicted as taken in the prediction operation, a target address indicated by the target address information may be fetched at a cycle time indicated by the branch time information.

12 Claims, 8 Drawing Sheets

(56) References Cited

U.S. PATENT DOCUMENTS

| | | | |
|---|---|---|---|
| 6,918,033 B1 | 7/2005 | Cho | |
| 7,278,012 B2 | 10/2007 | Sartorius et al. | |
| 7,765,534 B2* | 7/2010 | Archambault et al. | 717/154 |
| 7,814,469 B2* | 10/2010 | Wang et al. | 717/161 |
| 8,201,159 B2* | 6/2012 | Gschwind | 717/154 |
| 8,281,297 B2* | 10/2012 | Dasu et al. | 717/161 |
| 2003/0023959 A1* | 1/2003 | Park | 717/151 |
| 2003/0101444 A1* | 5/2003 | Wu et al. | 717/161 |
| 2004/0181785 A1* | 9/2004 | Zwirner et al. | 717/140 |
| 2006/0200809 A1* | 9/2006 | Grcevski et al. | 717/140 |
| 2007/0180438 A1* | 8/2007 | Suba | 717/151 |

OTHER PUBLICATIONS

Kim et al.Wish Branches: Combining Conditional Branching and Predication for Adaptive Predicated Execution.38th Annual IEEE/ACM International Symposium Microarchitecture, 2005, Retrieved on [Sep. 24, 2014] Retrieved from the Internet:URL< http://ieeexplore.ieee.org/stamp/stamp.jsp?tp=&arnumber=1540947>.*

* cited by examiner

FIG.4A

```
BB1:    ld   r1, 0, r2       mov 100, r3
        nop                  nop
        sub r2, 1, r2        add r4, r5, r4
        cmp_eq r3, r2        nop
        branch BB3           nop
        nop                  nop BB2:    ld   r4, r5, r2      add r6, r7, r6
        nop                  nop
        add r2,  1, r7       add r2, 2, r8
        jump BB4             lsl r2, 2, r10
        lsl r2,  3, r11      nop BB3:    ld   r8, r9, r12     nop
        nop                  nop
BB4:    add r10, r11, r2     nop
```

FIG.5A

```
BB1:    ld   r1, 0, r2       mov 100, r3
        JTSc 2,  t, BB3      nop
        sub r2,  1, r2       add r4, r5, r4
        test_eq r3, r2       nop BB2:    ld   r4, r5, r2      add r6, r7, r6
        JTSu 2,  t, BB4      nop
        add r2,  1, r7       add r2, 2, r8
        lsl r2,  3, r10      lsl r2, 2, r11

BB3:    ld   r8, r9, r12     nop
        nop                  nop
BB4:    add r10, r11, r2     nop
```

STATIC BRANCH PREDICTION METHOD AND CODE EXECUTION METHOD FOR PIPELINE PROCESSOR, AND CODE COMPILING METHOD FOR STATIC BRANCH PREDICTION

CROSS-REFERENCE TO RELATED APPLICATION

This application claims the benefit under 35 U.S.C. §119(a) of a Korean Patent Application No. 10-2009-0011513, filed on Feb. 12, 2009, in the Korean Intellectual Property Office, the entire disclosure of which is incorporated herein by reference for all purposes.

BACKGROUND

1. Field

The following description relates to a processor for executing instructions, and more particularly to a pipeline processor.

2. Description of the Related Art

In a pipeline processor, one instruction is processed through several stages. For example, a process of processing an instruction may be separated into a fetch stage, a decode stage, an execute stage, a memory access stage, and a write stage. A plurality of instructions may be executed in parallel while sequentially passing through the respective stages of a pipeline processor so that a program may be processed more efficiently in comparison to a non-pipeline processor.

Factors affecting the performance of a pipeline processor include a branch hazard or a pipeline control hazard. The branch hazard indicates that the processing speed of a pipeline processor is deteriorating due to a branch instruction. Because a pipeline processor cannot obtain the address of an instruction to be fetched until the decode stage of a branch instruction is completed or the execute stage is performed, the branch instruction may deteriorate the performance of the pipeline processor, because the processor is delayed. Research for removing the branch hazard of a pipeline processor is underway, and techniques such as dynamic branch prediction, delayed branch, and static branch prediction have been suggested.

Meanwhile, in a reconfigurable processor, a coarse-grained array (CGA) accelerates loops involving a large amount of data operations and performs the operations, while a very long instruction word (VLIW) machine executes a control part. Generally, the control part has a small basic block (BB) and simple data flow. In the VLIW machine, an instruction execution schedule is determined by a compiler, which is software outside the processor. Meanwhile, the execution schedule inside the processor is fixed allowing the hardware to be simplified.

Among the above-mentioned techniques for mitigating the branch hazard, the dynamic branch prediction technique predicts the corresponding conditional branch instruction as taken or not-taken, depending on a history. The dynamic branch prediction technique occurs while a program is being executed. The dynamic branch prediction technique requires a great deal of hardware to solve the branch problem, and is not an ideal solution for removing the pipeline control hazard of a VLIW machine that has a simple hardware constitution. Also, the delay branch technique has a small BB and is not ideal for a VLIW machine that usually processes a large instruction into a number of small instructions.

In the static branch prediction technique, a conditional branch instruction is predicted as taken or not-taken before a program is executed. According to a conventional static branch prediction technique, a delay slot is not used when a conditional branch instruction is predicted as not-taken, and a delay slot is included behind a conditional branch instruction when the conditional branch instruction is predicted as taken. Thus, it is also difficult to apply the conventional static branch prediction technique to a VLIW machine. Furthermore, the conventional static branch prediction technique requires a large amount of information (data) to perform a branch operation and must perform many tasks, for example, a comparison process, a branch process, and the like. Thus, processing of a branch instruction may result in the lack of encoding space.

SUMMARY

In one general aspect, there is provided a static branch prediction method for a pipeline processor, the method including predicting a conditional branch code as taken or not-taken, converting the conditional branch code into a jump target address setting (JTS) code including target address information, branch time information, and a test code, scheduling the JTS code and the test code in a block such that the test code is scheduled into a last slot of the block and the JTS code is scheduled into an empty slot of the block, after scheduling all other codes in the block, and fetching a target address indicated by the target address information at a cycle time indicated by the branch time information when the conditional branch code is predicted as taken.

The static branch prediction method may further include executing the test code to determine if the conditional branch code prediction is true.

The static branch prediction method may further include processing the codes fetched in the fetch operation as they are when it is determined that the prediction is true, and flushing all the codes fetched in the fetch operation when it is determined that the prediction is false.

The cycle time indicated by the branch time information may be next to a cycle time at which the test code is fetched.

The JTS code may further include prediction information, and the prediction information may be used to determine whether the conditional branch prediction is true.

The static branch prediction method may further include, when the conditional branch code is predicted as not-taken, fetching an address of a block next to the current block after fetching the test code, and processing the codes fetched in the fetch operation as they are when it is determined by executing the test code that the prediction is true, and flushing all the codes fetched in the fetch operation and fetching the target address indicated by the target address information of the JTS code, when it is determined that the prediction is false.

In another aspect, there is provided a code compiling method for static branch prediction, the method including converting a conditional branch code into a jump target address setting (JTS) code including target address information, branch time information, and a test code, and scheduling all codes in a block including scheduling the test code into a last slot of the block and scheduling the JTS code into an empty slot, after scheduling all the other codes in the block.

The JTS code may further include prediction information indicating taken or not-taken.

The prediction information may indicate taken, and the branch time information may indicate a cycle time at which a target block indicated by the target address information is fetched.

The cycle time at which the target block is fetched may be next to a cycle time at which the test code is fetched.

In another aspect, there is provided a code execution method for a pipeline processor, the method including converting a conditional branch code into a jump target address setting (JTS) code including target address information and branch time information, scheduling the JTS code into an empty slot of a block obtained after all other codes in the block are scheduled, and fetching a target address indicated by the target address information at a cycle time indicated by the branch time information.

Other features and aspects will be apparent from the following detailed description, the drawings, and the claims.

BRIEF DESCRIPTION OF THE DRAWINGS

FIG. 4A illustrates the results of compiling the codes of FIG. 3 according to a conventional static branch prediction method.

FIG. 5A illustrates the results of compiling the codes of FIG. 3 according to an exemplary static branch prediction method.

Figure 1:
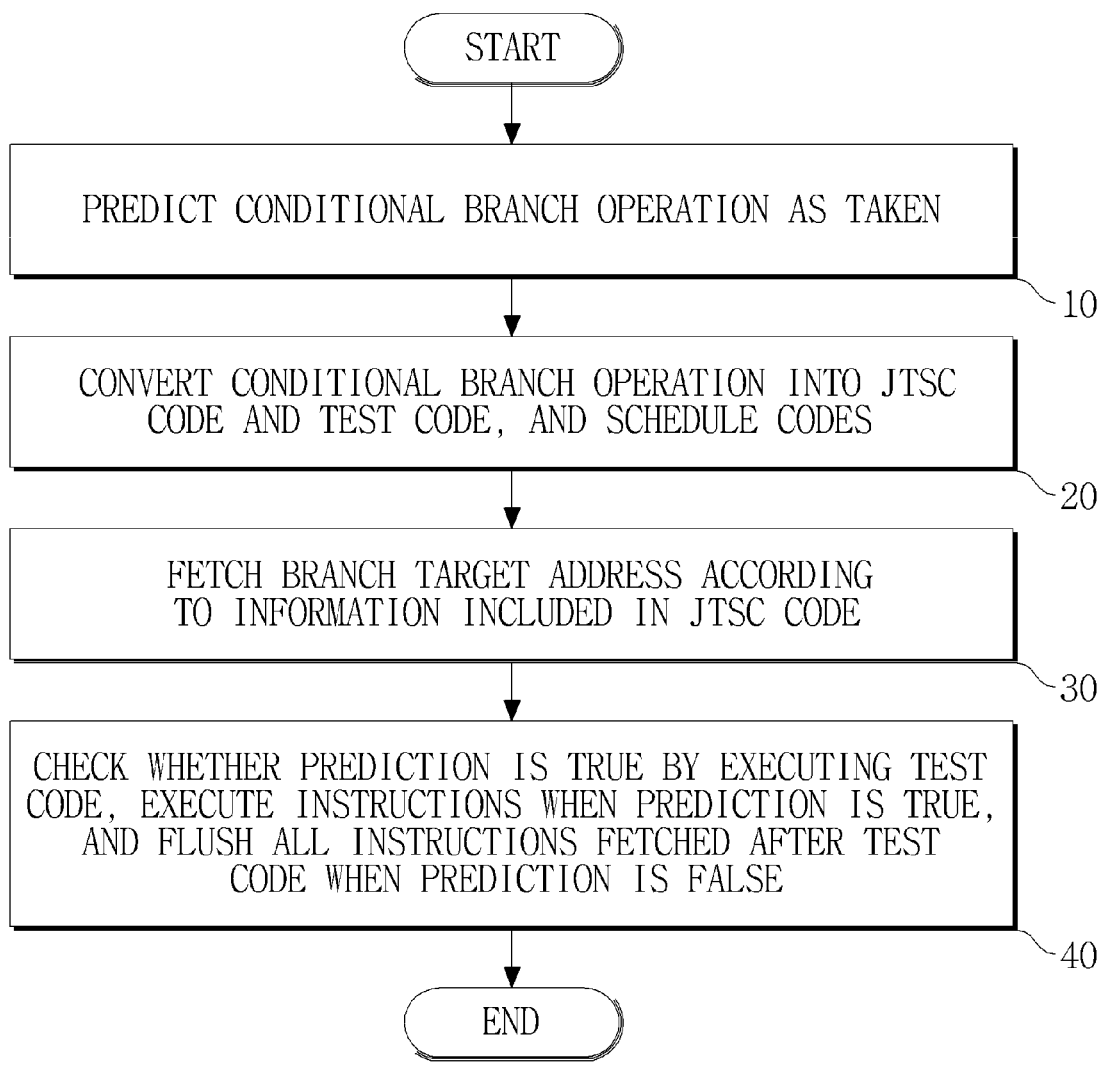
FIG. 1 is a flowchart illustrating an exemplary static branch prediction method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a flowchart illustrating an exemplary static branch prediction method. The example illustrated in FIG. 1 includes a conditional branch instruction or code that is included in the source code of an instruction register (IR).

Referring to FIG. 1, a conditional branch operation is predicted as taken or not-taken in 10. FIG. 1 illustrates a case in which the conditional branch operation is predicted as taken but is only an example. There is no limit to the algorithm algorithms that may be used to predict that a conditional branch instruction will be taken or not-taken. For example, an algorithm such as predicting every instruction as taken, predicting every instruction as not-taken, performing profile-based prediction, and the like, may be used. The information resulting from 10 about whether a conditional branch operation is predicted as taken or not-taken is added to each conditional branch instruction in a scheduling or compiling operation in 20, which will be described in more detail with reference to FIG. 2.

In 20, the conditional branch instruction is converted into a jump target address setting (JTSc) code and a test code, and codes in an IR are scheduled. In this example, the phrases "JTSc code" and "test code" are merely examples, and other terms and or phrases for performing the same functions and including the same or similar information for the functions, may be used instead. In the scheduling operation, codes in each IR or BB are rearranged in order of execution, and may be a part of a process of compiling instructions. Instructions in one IR are compiled using one processing block in a processor having one pipeline, but may be compiled using a plurality of processing blocks in a superscalar structure.

A JTSc ("c" denotes "conditional") code may include, for example, target address information, branch time information, and/or prediction information. The target address information may be address information of a target block to be executed when the conditional branch operation is selected as taken.

As referred to herein, when the conditional branch operation is predicted as taken, the prediction is true, and when the conditional branch operation is predicted as not-taken, the prediction is false.

The branch time information indicates when a branch occurs, and may be a value indicating after how many cycles the test code is executed. In 10, the prediction information indicates whether the conditional branch operation is predicted as taken or not-taken, and may be set to a value indicating taken 't' or not-taken 'n'. The prediction information may be used to compare the result of a test operation with the prediction.

The test code or test instruction may be used to check whether the prediction made in 10 is true, and may function as, for example, a compare instruction. To execute the test instruction, a result of executing another instruction is desired. Thus, the test instruction is generally scheduled to be processed last in the corresponding block, however, it may be scheduled to be processed earlier.

Figures 2, 3:
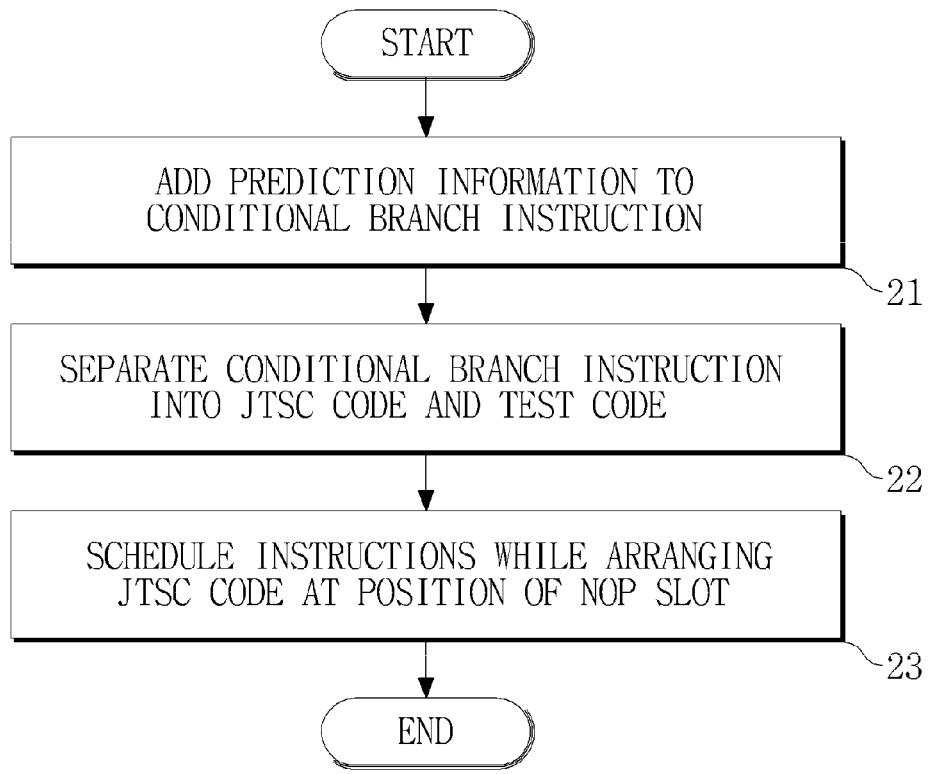
FIG. 2 is a flowchart illustrating an exemplary instruction scheduling process as illustrated in the method of FIG. 1.
FIG. 3 illustrates examples of codes in an exemplary instruction register (IR) that may be executed in a very long instruction word (VLIW) machine.

FIG. 2 is a flowchart illustrating an example of an instruction scheduling process or a process of compiling codes of an IR in 20, of FIG. 1.

Referring to FIGS. 1 and 2, prediction information is added to a conditional branch instruction in 21. The prediction information denotes the prediction result of 10 in FIG. 1, and may indicate whether a conditional branch operation is taken 't' or not-taken 'n'. The conditional branch instruction including the prediction information is separated into a JTSc code and a test code, in 22. Among information included in the conditional branch instruction, information for a comparison operation is included in the test code as mentioned above, and target address information, and the like, may be included in the JTSc code. Branch time information may include, for example, a value indicating after how many cycles the test code is executed. Also, the prediction information inserted in 21 may be included in the JTSc code.

The JTSc code, the test code, and other instructions included in the corresponding block are, arranged in order of execution, in 23. For example, the instructions other than the JTSc code may be first scheduled according to any desired conventional method. The conventional method may be an instruction scheduling method performed when a conditional branch instruction is executed without being separated into a JTSc code and a test code. For example, according to a conventional method using a delay slot, a branch instruction may be inserted behind a compare instruction. Delay slots may be scheduled to be inserted behind the branch instruction such that other instructions not dependent on the compare instruction may be arranged in the delay slots.

On the other hand, in the current example in which a conditional branch instruction is separated into a JTSc code and a test code, the test code dependent on the other instructions in the corresponding block is executed last in the block. After all the other instructions are scheduled, the execution order of the JTSc code is determined. As mentioned above, because the JTSc code is not dependent on other instructions, it may be scheduled and arranged at any position. The JTSc code may include information about the address of a block to be fetched next to a current block when a branch occurs by a conditional branch instruction. The earlier such information is obtained, the more helpful for removing or reducing the branch hazard of a pipeline processor. Thus, in the current example, the JTSc code may be scheduled such that it may be executed as early as possible. For example, the JTSc code may be located in the foremost one of slots assigned as no operation or 'nop' slots, according to the conventional scheduling method, in 22.

Referring back to FIG. 1, in 30, instructions are sequentially fetched and executed in order of the schedule. When the conditional branch operation is predicted as taken in 10, the address of a block indicated by the target address information included in the JTSc code may be fetched at a cycle indicated by the branch time information included in the JTSc code, after the test code is fetched, as illustrated in FIG. 1. On the other hand, when the conditional branch operation is predicted as not-taken in 10, instructions of a block next to the current block may be sequentially fetched after the test code is fetched.

Such an instruction fetch operation based on prediction may be performed after the test code is fetched and performed until the decode stage of the test code is finished, or it is possible to check whether the prediction is true by the execute stage of the test code. Thus, even if the conditional branch operation is predicted as taken in 10, it is possible not to use a delay slot or to reduce use of a delay slot as much as possible. This is because in the current example, a target address to be branched and a branch time may be obtained in advance by first executing the JTSc code separated from the conditional branch instruction, even if the test code is not decoded and executed.

In 40, the test code of the corresponding block may be executed subsequently, and the fetched instructions may be processed or the test code may be flushed and the instructions may be fetched. For example, when the prediction made in 10 is true, the instructions are executed in the fetch sequence of 30, but when the prediction made in 10 is false, all the instructions fetched after the test code are flushed, and another address, for example, a target address included in a block next to the corresponding block or the JTSc code, may be fetched. The prediction information included in the JTSc code may be used to check whether the prediction is true.

For this example, it is assumed that the conditional branch operation is predicted as taken in 10, as illustrated in FIG. 1. When the execute stage of the test code is performed, it is checked that the prediction is true, and instructions of a block indicated by a branch address included in the JTSc code, that is, the instructions fetched after the test code, are processed as they are. On the other hand, when the prediction is false, all the instructions fetched after the test code are flushed, and instructions of the block next to the current block are fetched instead.

FIG. 3 shows examples of codes in an IR that may be executed in a very long instruction word (VLIW) machine. A conventional static branch prediction method and the exemplary static branch prediction method are described below using examples of codes shown in FIG. 3.

Figure 4B:
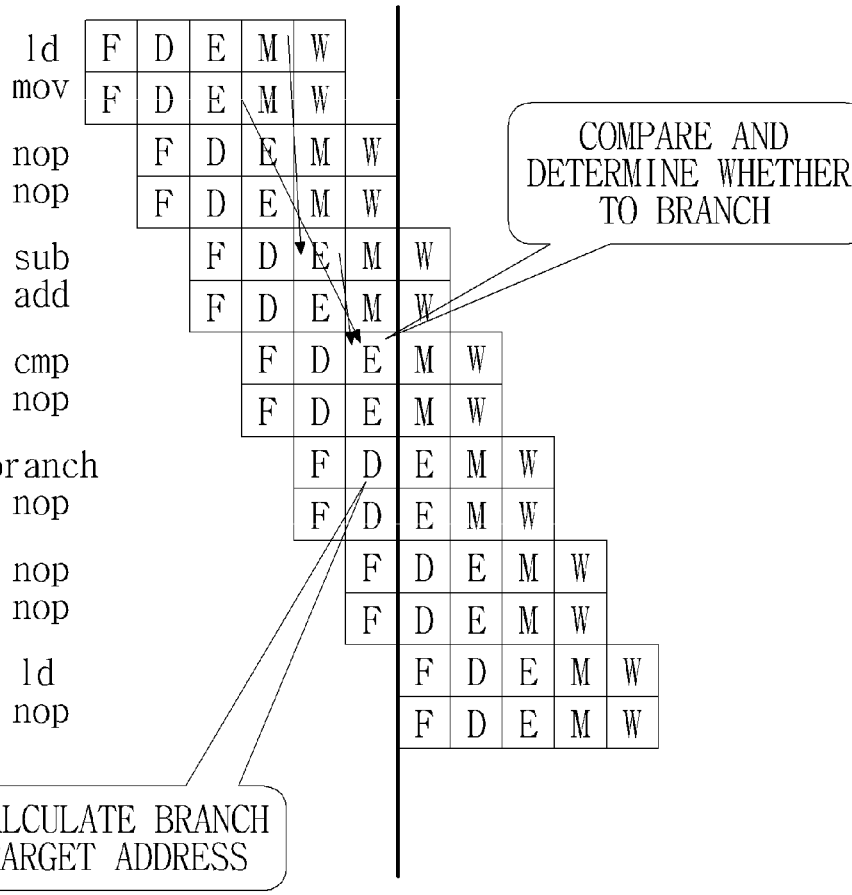
FIG. 4B illustrates pipeline stages for some of the scheduled codes of FIG. 4A when the conventional static branch prediction is true.
Figure 5B:
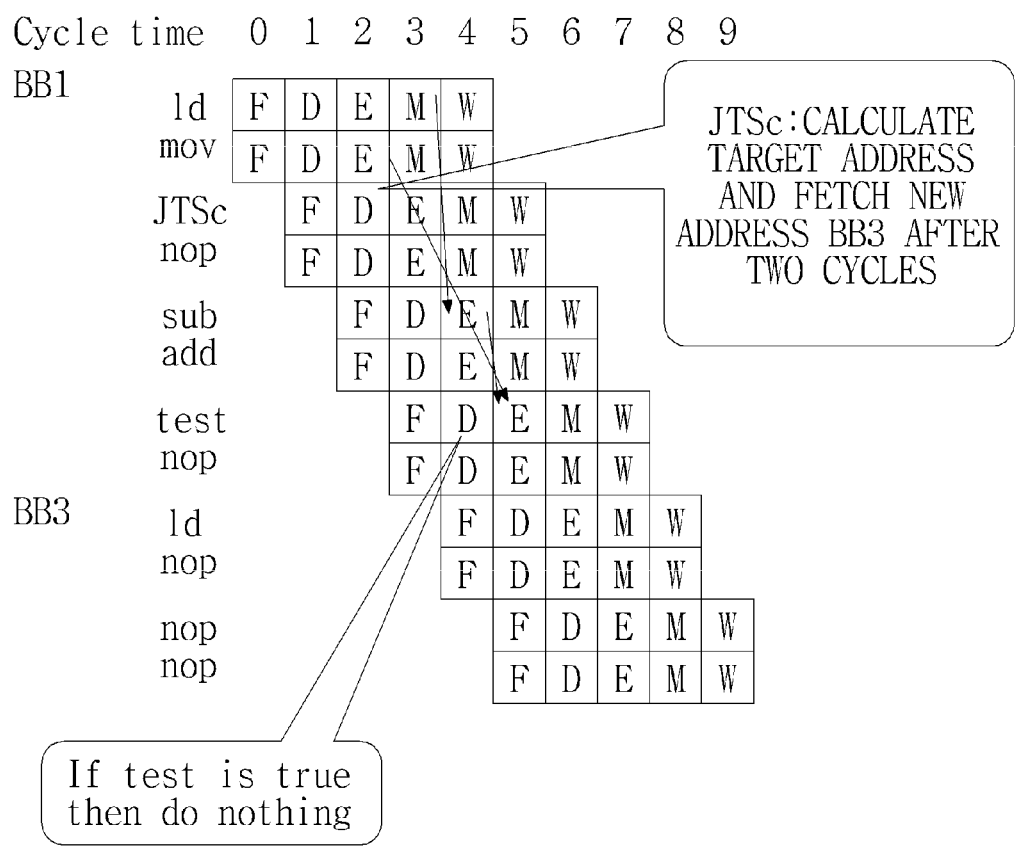
FIG. 5B illustrates pipeline stages for some of the scheduled codes of FIG. 5A when the static branch prediction is true.

FIG. 4A illustrates the result of scheduling, that is, compiling the codes of FIG. 3, according to a conventional static branch prediction method. FIG. 4B illustrates pipeline stages for some of the scheduled codes of FIG. 4A, when the prediction is true. FIG. 5A illustrates the result of scheduling, that is, compiling the codes of FIG. 3, according to various embodiments. FIG. 5B illustrates pipeline stages for some of the scheduled codes of FIG. 5A, when prediction is true. In FIGS. 4B and 5B, the letters 'F', 'D', 'E', 'M', and 'W' denote the fetch stage, decode stage, execute stage, memory access stage, and write stage, respectively. The illustrated examples are about a superscalar structure including two processing blocks, but this hardware constitution is merely an example.

Referring to FIGS. 4A and 4B, when the conventional method is used, values r3 and r2 are compared in the execute stage of a compare instruction 'cmp' to determine whether or not to branch, and a branch target address to be fetched in the future may be obtained in the decode stage of a branch instruction branch. Thus, the conventional method requires a delay slot behind the branch instruction. In FIG. 4A, 'nop' is added because there is no appropriate code to be inserted into a delay slot. In the illustrated example, six cycles are taken to perform a first BB, BB1, due to the addition of the delay slot, and a new target address is fetched at cycle time 6.

Referring to FIGS. 5A and 5B, a branch target address may be obtained at cycle time 2 that is the decode stage of a JTSc code, and an instruction of a third BB, BB3, may be fetched at cycle time 4, after two cycles. Then, a test code may be decoded and executed. When branch prediction is true, nothing is performed, and the pipeline processor continuously processes instructions. Thus, according to the illustrated example, four cycles are taken to execute the first BB, BB1, and a target address is fetched at cycle time 4. Accordingly, the processing speed and performance of a pipeline processor may be improved in comparison to the conventional pipeline processor.

Figure 5C:
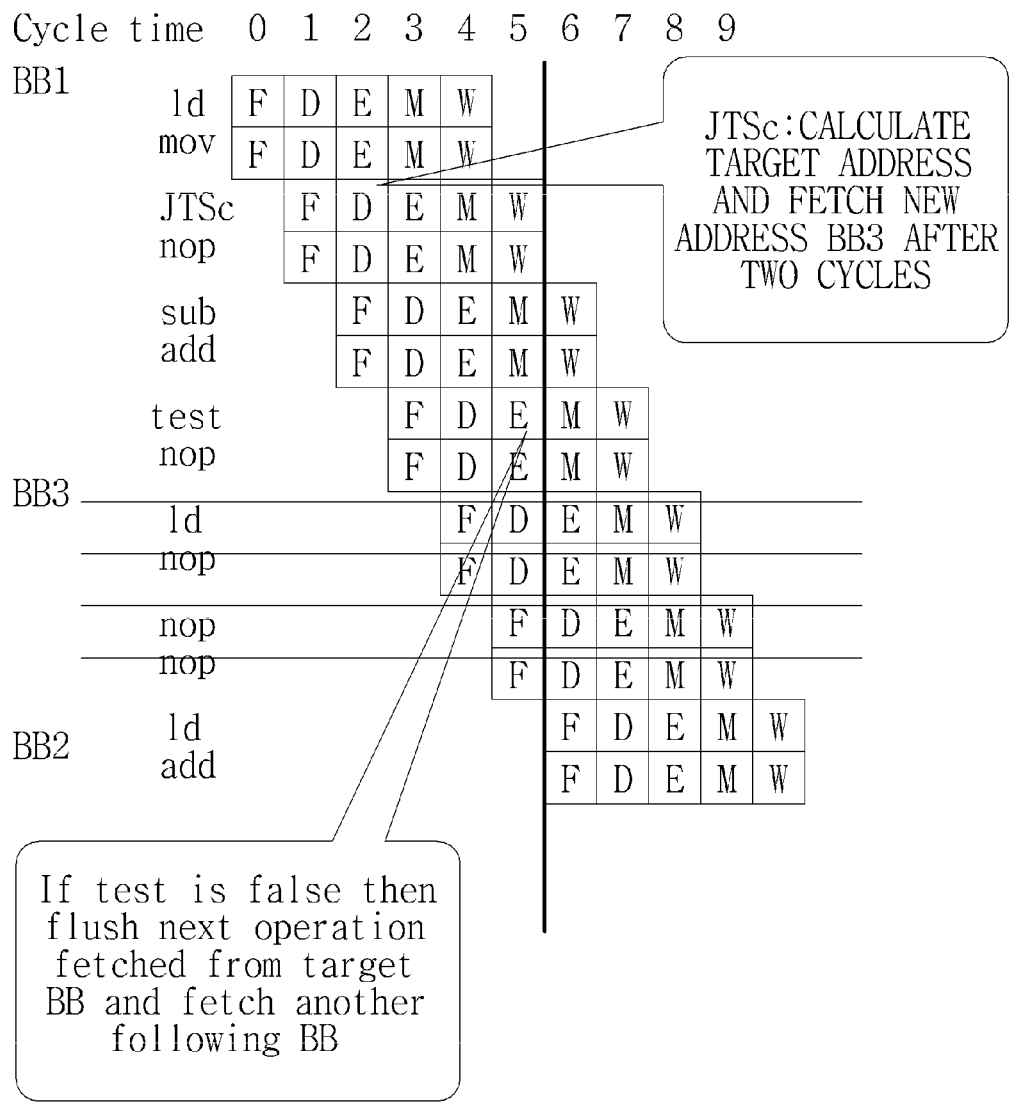
FIG. 5C illustrates pipeline stages for some of the scheduled codes of FIG. 5A when the static branch prediction is false.

FIG. 5C illustrates pipeline stages for some of the scheduled codes of FIG. 5A when prediction is false. Referring to FIG. 5C, as in FIG. 5B, the JTSc code of the first BB, BB1, is decoded to calculate a target address at cycle time 2, and the third BB, BB3, is fetched at cycle time 4, after two cycles. However, because prediction is determined to be false when the test code is executed, all operations fetched from the third BB, BB3, are flushed, and a second BB, BB2, is fetched at cycle time 6.

Figure 6:
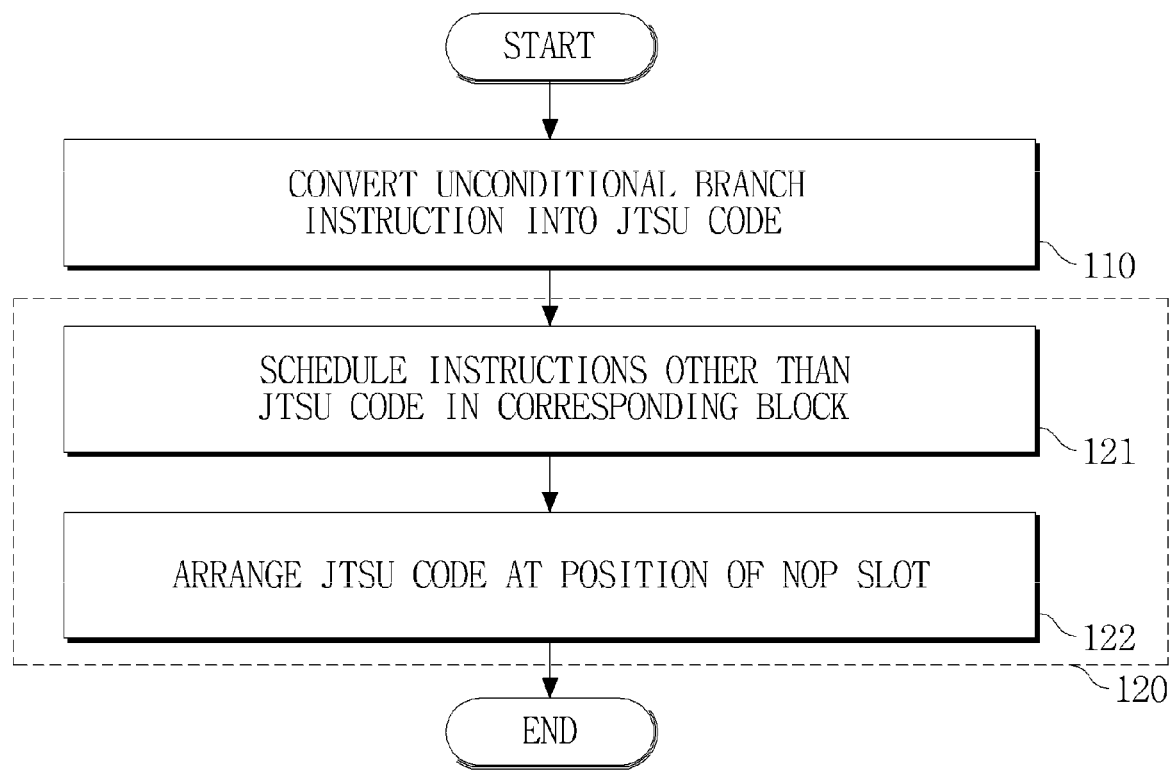
FIG. 6 is a flowchart illustrating another exemplary method of compiling an instruction.

FIG. 6 is a flowchart illustrating an exemplary method of scheduling or compiling an instruction when a source code includes an unconditional branch instruction. For example, the unconditional branch instruction may be a code "jump" of the second BB, BB2, in the example shown in FIG. 3. The jump instruction is only for exemplary purposes. Other unconditional branch instructions may be compiled.

Referring to FIG. 6, in 110, the unconditional branch instruction 'jump' is converted into a jump target address setting (JTSu) code (operation 110). In this example, the phrase "JTSu ("u" denotes "unconditional") code" is used to denote unconditional code. The phrase is merely exemplary, and another term for performing the same function or similar functions and including the same information or similar information for the function, may be used instead.

A JTSu code may include target address information and branch time information. These terms are also examples. The target address information may be address information of a target block to be fetched when a branch operation or jump operation is performed according to an unconditional branch operation. The branch time information may indicate when a branch or a jump occurs, or will occur. A JTSu code includes information that a conventional jump code includes, and the JTSu code also includes branch time information. Prediction information is not needed to execute an unconditional branch instruction.

In 120, the corresponding block including the JTSu code is scheduled. The scheduling operation in which codes in each IR or each BB are rearranged in order of execution may be a part of a process of compiling instructions. In a processor having one pipeline, instructions in one IR are compiled in one processing block, while they may be compiled by a plurality of processing blocks in a superscalar structure. FIG. 4A illustrates an example of the result of scheduling the second BB, BB2, of FIG. 3, including an unconditional branch instruction.

For example, instructions other than a JTSu code may be scheduled in 121. In other words, instructions other than a JTSu code included in the corresponding block (BB2) are arranged in order of execution. In this example, a method of scheduling the instructions other than a JTSu code is not limited, and any conventional method in the field may be applied.

After all the other instructions are scheduled, the execution order of the JTSu code is determined in 122. Because a JTSu code is not dependent on the other instructions, there is no limit to scheduling it. Also, a JTSu code includes branch time information, unlike a jump code, and thus has greater flexibility in scheduling than a jump code that must be executed last in the corresponding block. The scheduling may be performed so that the JTSu code may be executed as early as possible in the corresponding block. For example, the JTSu code may be located in the foremost one of slots assigned as nop slots.

In the current example, a delay slot does not need to be added behind a JTSu code. According to the conventional method illustrated in FIG. 4B, a delay slot is added even after a jump operation is performed in the second BB, BB2. However, when scheduling is performed using a JTSu code including branch time information together with target address information, the JTSu code may be arranged at the fore part of the corresponding block, and thus a delay slot does not need to be added. Thus, the scheduling performed by the exemplary methods herein, may be performed in less cycles than the conventional method. Consequently, the performance and speed of a pipeline processor may be improved.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As apparent from the above description, the above-described examples use a static branch prediction method that involves adding little hardware and does not use a delay slot. Thus, the examples may be used for processing a control part, for example, having a small BB and suited for a VLIW machine. Also, the examples require a shorter cycle time for processing a BB than a conventional method. Thus, it is possible to improve the performance and speed of a processor, and simplify a compiler. Furthermore, a JTS instruction may be scheduled into an empty slot after all other instructions in a BB are scheduled. Thus, schedule quality may be high, and a large encoding space is not needed to process a conditional branch instruction.

According to certain example(s) described above, there is provided a static branch prediction method and apparatus that may improve the performance of a pipeline processor by reducing or removing a control hazard, and a compiling method for static branch prediction. For example, a static branch prediction method and apparatus for a pipeline processor appropriate for processing a program having a small number of instructions in a basic block (BB) at high speed, and a compiling method for static branch prediction are disclosed.

According to certain example(s) described above, there is provided a static branch prediction method and apparatus that involve adding little hardware to a pipeline processor and may not need to use a delay slot even if a branch instruction is predicted as taken, and a compiling method for static branch prediction. For example, a static branch prediction method and apparatus capable of preventing the lack of encoding space while processing a branch instruction, and a compiling method for static branch prediction are disclosed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor-implemented static branch prediction method for a pipeline processor, the method comprising:
   predicting a conditional branch code as taken or not-taken;
   converting the conditional branch code into a jump target address setting (JTS) code including target address information, branch time information, and a test code;
   scheduling the JTS code and the test code in a block such that the test code is scheduled into a last slot of the block and the JTS code is scheduled into an empty slot of the block, after scheduling all other codes in the block; and
   fetching a target address indicated by the target address information at a cycle time indicated by the branch time information when the conditional branch code is predicted as taken.

2. The static branch prediction method of claim 1, further comprising executing the test code to determine if the conditional branch code prediction is true.

3. The static branch prediction method of claim 2, further comprising processing the codes fetched in the fetch operation as they are when it is determined that the prediction is true, and flushing all the codes fetched in the fetch operation when it is determined that the prediction is false.

4. The static branch prediction method of claim 1, wherein the cycle time indicated by the branch time information is next to a cycle time at which the test code is fetched.

5. The static branch prediction method of claim 1, wherein the JTS code further includes prediction information, and the prediction information is used to determine whether the conditional branch prediction is true.

6. The static branch prediction method of claim 1, further comprising:
    when the conditional branch code is predicted as not-taken, fetching an address of a block next to the current block after fetching the test code; and
    processing the codes fetched in the fetch operation as they are when it is determined by executing the test code that the prediction is true, and flushing all the codes fetched in the fetch operation and fetching the target address indicated by the target address information of the JTS code, when it is determined that the prediction is false.

7. A code compiling method executed by a processor for static branch prediction, the method comprising:
    converting a conditional branch code into a jump target address setting (JTS) code including target address information, branch time information, and a test code; and
    scheduling all codes in a block including scheduling the test code into a last slot of the block and scheduling the JTS code into an empty slot, after scheduling all the other codes in the block.

8. The code compiling method of claim 7, wherein the JTS code further includes prediction information indicating taken or not-taken.

9. The code compiling method of claim 8, wherein when the prediction information indicates taken, and the branch time information indicates a cycle time at which a target block indicated by the target address information is fetched.

10. The code compiling method of claim 9, wherein the cycle time at which the target block is fetched is next to a cycle time at which the test code is fetched.

11. The code compiling method of claim 7, wherein the last slot of the block is other than an empty slot of the block.

12. A processor-implemented code execution method for a pipeline processor, the method comprising:
    converting a conditional branch code into a jump target address setting (JTS) code including target address information and branch time information;
    scheduling the JTS code into an empty slot of a block obtained after all other codes in the block are scheduled; and
    fetching a target address indicated by the target address information at a cycle time indicated by the branch time information.

* * * * *